United States Patent [19]
Arata

[11] Patent Number: 5,880,860
[45] Date of Patent: Mar. 9, 1999

[54] GRADED COLOR ACQUISITION METHOD AND APPARATUS IN IMAGE PROCESSING

[75] Inventor: Kazunori Arata, Shizuoka, Japan

[73] Assignee: Fujitsu Limited, Kawasaki, Japan

[21] Appl. No.: 513,122

[22] Filed: Aug. 9, 1995

[30] Foreign Application Priority Data

Jan. 5, 1995 [JP] Japan ................................. 7-000323

[51] Int. Cl.⁶ ...................................................... G03F 3/08
[52] U.S. Cl. .......................................... 358/521; 345/199
[58] Field of Search ..................................... 358/518, 521, 358/523, 524, 525; 382/167, 162, 169, 166; 702/85; 345/199

[56] References Cited

U.S. PATENT DOCUMENTS

| | | | |
|---|---|---|---|
| 4,901,258 | 2/1990 | Akiyama | 358/525 X |
| 5,479,272 | 12/1995 | Saito | 358/518 |
| 5,537,579 | 7/1996 | Hiroyuki | 395/500 |
| 5,592,312 | 1/1997 | Noguchi | 358/525 |
| 5,610,732 | 3/1997 | Komatsu | 358/525 |
| 5,737,101 | 4/1998 | Ito | 358/525 |
| 5,745,103 | 4/1998 | Smith | 345/199 |

FOREIGN PATENT DOCUMENTS

3-53293  3/1991  Japan .

*Primary Examiner*—Melanie Kemper
*Attorney, Agent, or Firm*—Staas & Halsey

[57] ABSTRACT

An acquisition color specifying section works within a computer system to process graded color. The number of individual gradation levels which may be acquired in color gradation or density gradation is limited by the computer system. To address this limitation, the acquisition color specifying section specifies graded colors to be acquired without modification or substitution in a case where the number of available colors of the color table of a system is equal to or larger than the number of graded colors to be originally acquired. In a case where the number of available colors of the color table is less than the number of graded colors to be originally acquired, a blank is present in the color table. In this case, the acquisition color specifying section specifies graded colors of a number corresponding to the blank of the color table such that the graded colors will be uniformly distributed in a gradation range to be acquired. An acquisition process controlling section acquires specified graded colors and registers the graded colors into a color table of a color table storing section. An allocation processing section then allocates acquired graded colors which are most approximately equal to the originally requested graded colors when the number of graded colors registered in the color table is less than a required number of representation colors.

16 Claims, 10 Drawing Sheets

| COLORS TO BE ORIGINALLY DISPLAYED | 1 | 2 | 3 | 4 | 5 | 6 | 7 | 8 | 9 |
|---|---|---|---|---|---|---|---|---|---|
| COLORS TO BE ACTUALLY DISPLAYED | 1 | 1 | 1 | 5 | 5 | 5 | 9 | 9 | 9 |

FIG. 14

GRADED COLOR ACQUISITION METHOD AND APPARATUS IN IMAGE PROCESSING

BACKGROUND OF THE INVENTION

The present invention relates to image processing of image data represented by gradation. More particularly, the present invention relates to a graded color acquisition method and apparatus for acquiring gradation information of individual gradation levels in a color gradation or a density gradation (i.e. a so-called "grey scale" in the case of black and white representation).

A density gradation is, for example, a set of color data items and gradation information related to the set of color data items, and is hereinafter generally referred to as "graded color."

Recently, computer systems are becoming widely used in multimedia applications to produce various images, such as video created by television systems (TV), CG images created by computer graphic systems (CG), and medical images created by medical image systems. These images are often treated by image processing programs. Unlike character images and simple color coding images, the above images contain gradation components such as neutral colors or light, and shades for representing gradation by density or color. In such gradation, as the number of gradation levels of the gradation components increases, the number of graded colors become larger and the gradation distribution of graded colors become more uniform. In other words, as the number and distribution of graded colors increases, a gradation representation which is closer to a natural gradation representation can be obtained.

In the application of image processing, that is, during execution of an image processing program, the number of colors which can be treated by a system such as an operating system is smaller than the number of colors which can be represented by hardware. Furthermore, in many cases, the number of colors which can be actually treated by the image processing program is smaller than the number of colors which can be treated by the entire system. Moreover, graded color is generally obtained by mixing color information items in a complicated mixing ratio.

For this reason, and in order to make it possible to easily and stably treat graded color in an image processing program, the graded color is conventionally acquired by the program from the system at the start of the program.

Further, with the spread of multi-window systems and multi-task systems, an image processing program is often operated while another image processing program is being operated. In such a case, since the respective image processing programs individually acquire the graded colors, the number of remaining colors which can be later acquired from the system becomes small and in some cases a new image processing program can not acquire a necessary number of graded colors. In such a case, generally, error processing is effective to prevent the image processing program from being started.

For example, in a multi-task system, an image processing program (program <A>) may require the arrangement of uniform graded colors, as in the case of a grey scale representation using shades of black and white. If another program (program <B>) using a large number of colors is also being operated in the background, most colors which can be treated by the system are used by the program <B> and the remaining number of colors which can be treated becomes small. At this time, if the remaining number of colors is smaller than the number of colors necessary for successful operation of the program <A>, graded colors of a number required by the program <A> cannot be acquired, thereby making it impossible to start program <A>.

Figure 1:
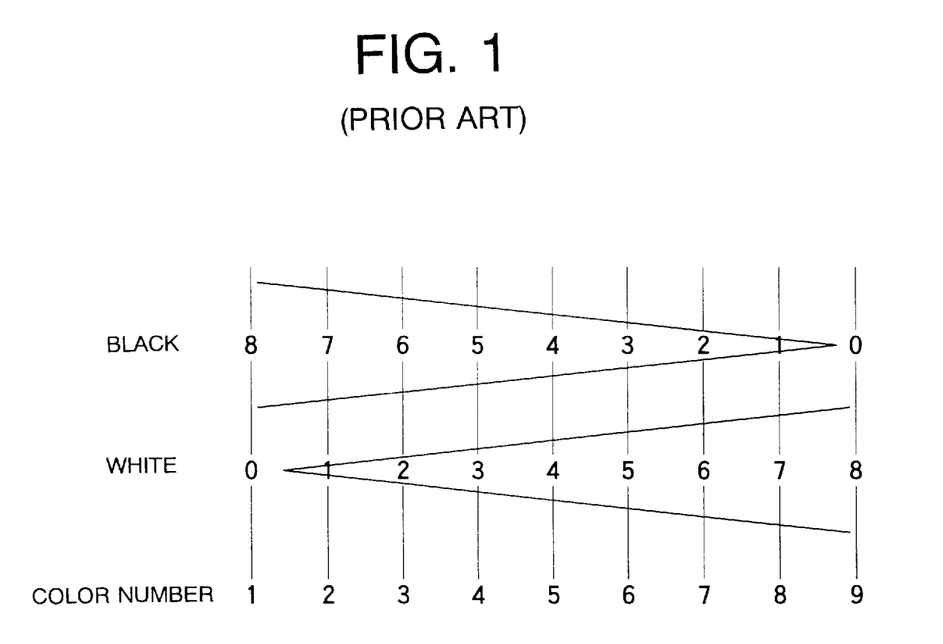
FIG. 1 is a schematic diagram illustrating one example of a conventional graded color acquisition process.

In a conventional image processing program, for example, as shown in FIG. 1, graded colors with a density gradation (i.e. a typical grey scale) having color numbers 1 to 9 may be obtained by mixing "black" and "white" according to a corresponding ratio. Then, the process of sequentially acquiring graded colors from the color 1 (i.e. "black") to the color 9 (i.e. "white") is effective.

Therefore, when the first half of the graded colors (for example, graded colors having colors 1 to 4) are acquired, it becomes impossible to acquire succeeding colors. Further, if an attempt is made to forcibly represent the image, the image as a whole becomes dark since no density gradation near the white portion is present. This make it impossible to correctly recognize the image. In such a case, the program recognizes the problem and is not started. That is, in the conventional image processing program, i.e. in a case where all necessary graded colors cannot be completely acquired, the program itself is not started.

Figure 2:
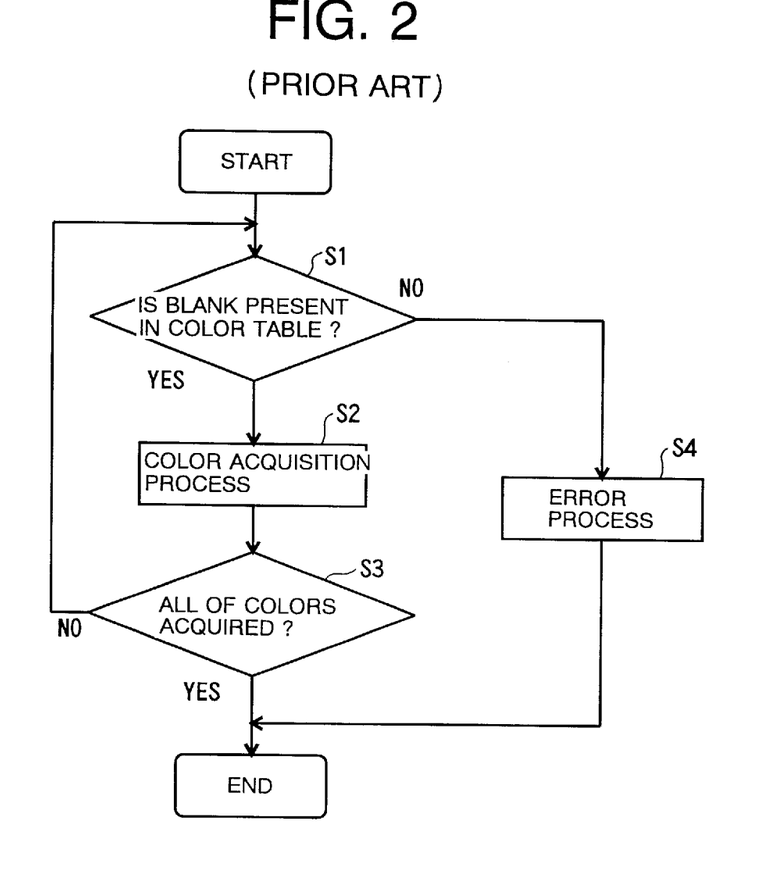
FIG. 2 is a flow chart illustrating a conventional graded color acquisition process.

The conventional graded color acquisition process is explained in detail with reference to FIG. 2. When a conventional graded color acquisition process is started, it is first determined whether a blank (i.e. a space) is present in the color table of the system (step S1). If a blank is present in the color table, the graded color acquisition process is sequentially effected from the color 1 as described above (step S2). Each time color acquisition is effected, a determination is then made whether all necessary colors have been acquired (step S3). If all colors have not been acquired, the process returns to step S1.

Thus, color acquisition is effected if a blank is present in the color table and continues until step S3 determines that all necessary colors have been acquired. If it is determined in step S3 that the acquisition of all colors is completed, the process is terminated.

Since it becomes impossible to ensure that a required number of colors for obtaining an adequate color distribution can be acquired if it is determined in step S1 that a blank is present in the color table, an error process is effected, starting of the program is interrupted (step S4), and the process is ended.

Further, in a case where colors are already acquired and used in program <B>, colors are selected which are "approximately" equal to the graded colors to be used in program <A> from the acquired colors. Then, the selected colors are used. However, with this method, the image represented in program <A> cannot be correctly recognized if a distribution of colors acquired by program <B> is non-uniform.

Figure 3:
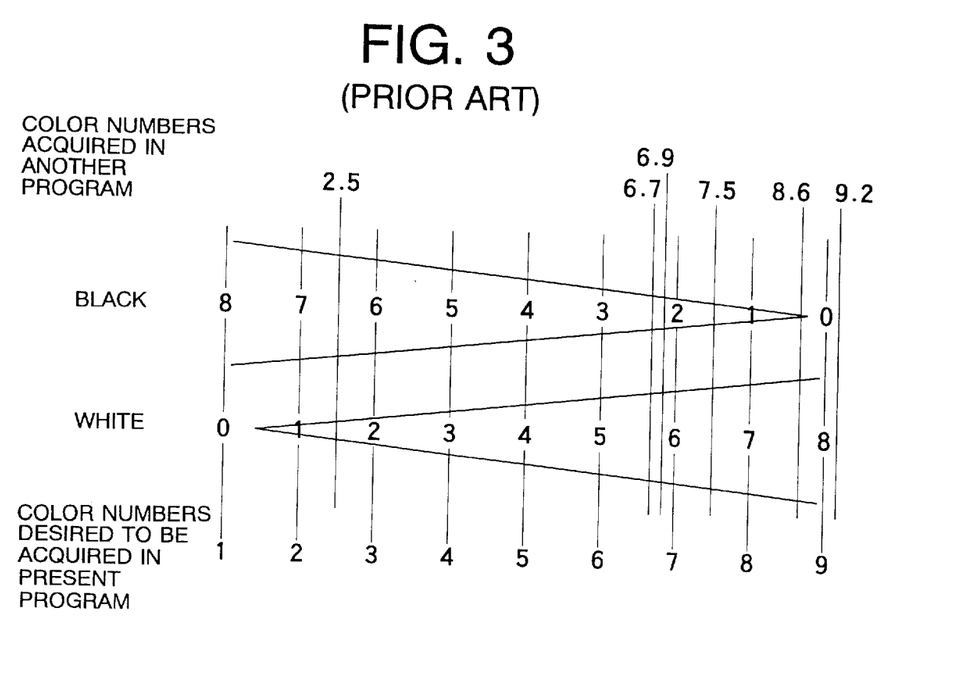
FIG. 3 is a schematic diagram illustrating another example of a conventional graded color acquisition process.
Figure 4:
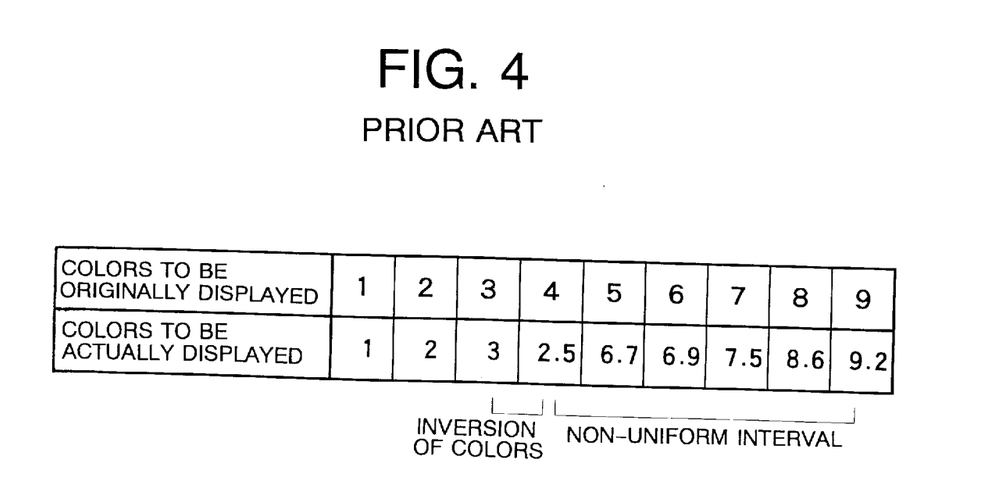
FIG. 4 is a schematic diagram illustrating one example of allocation in the graded color acquisition process of FIG. 3.

By way of example, an attempt may be made to acquire color 4 and succeeding color numbers by approximation to colors already acquired in program B, as shown in FIG. 3. However, in a state in which colors of color number 1 to color number 3 are acquired by use of the above color acquisition method, the color number of an acquired color which is nearest to color 4 is 2.5, as shown in FIG. 4. Thus, an inversion of colors used for actual representation occurs between the intended color 3 and the intended color 4 because the color 2.5 was substituted for color 4. Further, the entire color interval becomes non-uniform due to the acquisition of colors 4 to 9 by approximation.

The inversion of the array (i.e. order) of colors and the non-uniformity of the color interval will not develop into a serious problem when displaying characters or the like.

However, in a case of a video image such as a TV image photographed by a camera, the non-uniformity of the color interval makes the gradation appear unnatural. For example, the non-uniformity may cause a display of solarization, an irregular concentration of colors, and a degradation of image quality. Therefore, correct recognition of an intended image cannot be expected. In practice, since color of a more irregular distribution may be approximated in some cases, the original image itself cannot even be recognized.

Therefore, even if colors are acquired by approximation, display of a proper image cannot be obtained. Further, in a case where a sufficiently large blank is not present in the color table and all required colors cannot be acquired, it is a common practice to not start the program. As described above, in the conventional image processing program, the process of sequentially acquiring graded colors of a necessary density gradation in an order of color numbers is first effected. For this reason, if an acquisition of remaining colors becomes impossible before all necessary graded colors are acquired, an adequate representation becomes impossible. Further, when colors acquired and used by program <B> are present, and if colors approximately equal to the graded colors required by program <A> are selected from the acquired colors and used as approximate colors, the inversion of the array of colors and the non-uniformity of colors intervals make the gradation appear unnatural. Moreover, image quality is degraded and it is often impossible to correctly recognize an original image. This effect is often produced in a video image, such as a TV image photographed by a camera. Therefore, a proper image cannot be obtained even if the colors are acquired by approximation.

Thus, in most conventional programs, the program itself is not started in a case where a sufficiently large blank is not present in the color table and all of the required colors cannot be acquired.

SUMMARY OF THE INVENTION

An object of the present invention is to provide a graded color acquisition method and apparatus in image processing which acquires graded colors with uniform distribution irrespective of a number of acquirable graded colors.

It is a further object of the present invention to permit adequate gradation representation even if a number of acquirable graded colors is small, and permit a new program to be started irrespective of a number of acquirable graded colors.

A graded color acquisition method in image processing according to a first aspect of the present invention includes a blank detection step of detecting a blank in a color table of a system. A color acquisition step, effected in cooperation with the blank detection step, effects a process of acquiring graded colors as they are. This happens in a case where a number of available colors in the color table is equal to or larger than a number of graded colors to be originally acquired. Graded colors of a number corresponding to the blank of the color table are substantially uniformly distributed in a gradation range to be acquired in a case where the number of available colors in the color table is less than the number of graded colors to be originally acquired. The graded colors are then registered into the color table. An allocation processing step allocates acquired graded colors which are most approximately equal to the originally used graded colors as the graded colors for representation in a case where the number of graded colors registered in the color table is less than a required number of representation colors.

The color acquisition step may include an acquisition color specifying step of first specifying graded colors at both ends of a gradation range to be originally acquired and then sequentially specifying a substantially central graded color between the already specified colors. The color acquisition step may also include an acquisition processing step of repeatedly and sequentially acquiring graded colors specified in the acquisition color specifying step and registering the graded colors into the color table of the system until one of un-acquired graded colors and the blank of the color table of the system becomes unavailable.

Alternatively, the color acquisition step may include an equally dividing step of equally dividing the gradation range to be acquired based on the number of available colors to determine graded colors which are to be acquired. This happens in a case where the number of available colors of the color table of the system is less than the number of graded colors to be originally acquired. In this case, the color acquisition step includes an acquisition processing step of acquiring graded colors obtained in the equally dividing step and registering the graded colors into the color table of the system.

The above method may further include an acquired color detection step of detecting that graded colors to be originally used for representation are registered in the color table of the system. The acquired color detection step gives the number of graded colors, except the number of detected graded colors for use in the color acquisition step, when the graded colors to be originally used for representation are detected in the color table.

A graded color acquisition apparatus in image processing according to a second aspect of the present invention includes a color table storing section for storing a color table of a system. A color acquisition section effects a process of detecting a blank in the color table, acquiring graded colors to be acquired as they are in a case where the number of available colors in the color table is equal to or larger than the number of graded colors to be originally acquired, acquiring graded colors of a number corresponding to the blank of the color table to be substantially uniformly distributed in a gradation range to be acquired in a case where the number of available colors in the color table is less than the number of graded colors to be originally acquired, and registering the graded colors into the color table. An allocation processing section allocates those of the acquired graded colors which are most approximately equal to the graded colors to be originally used as the graded colors used for representation in a case where the number of graded colors registered in the color table is less than a required number of representation colors.

The color acquisition section set forth above may include an acquisition color specifying section for first specifying graded colors at both ends of a gradation range to be originally acquired and then sequentially specifying a substantially central graded color between the already specified colors. An acquisition processing section may also be included for repeatedly effecting the process of sequentially acquiring graded colors specified by the acquisition color specifying section and registering the graded colors into the color table of the system until one of an un-acquired graded color and the blank of the color table of the system becomes unavailable.

The acquisition color specifying section set forth above may also include an order table storing section for previously storing a specifying order table indicating an order of acquisition of the graded colors, and an acquisition instructing section for sequentially instructing that the acquisition colors be processed by the acquisition processing section according to the specifying order table.

The acquisition color specifying section set forth above may also include an acquisition color calculating section for first giving graded colors at both ends of an originally acquired gradation range. Then, the acquisition color specifying section sequentially calculates and gives a substantially central graded color between the already specified colors. An acquisition instructing section sequentially instructs that the acquisition colors be processed by the acquisition processing section according to graded colors given from the acquisition color calculating section.

Alternatively, the color acquisition section set forth above may include an equal-division processing section for equally dividing the gradation range to be acquired based on the number of available colors to determine graded colors which are to be acquired. This is in a case where the number of available colors of the color table of the system is less than the number of graded colors to be originally acquired. The color acquisition section then acquires graded colors obtained in the equal-division processing section and registers the graded colors into the color table of the system.

The above apparatus may further include an acquired color detection section for detecting that graded colors to be originally used for representation are registered in the color table of the system. The acquired color detection section gives the number of graded colors, except the number of detected graded colors, to the color acquisition section when the graded colors to be originally used for representation are detected in the color table.

In an image processing system using the graded color acquisition method and apparatus according to the present invention, graded colors to be acquired are acquired as they are in a case where the number of available colors of the color table of the system is equal to or larger than the number of graded colors to be originally acquired. Graded colors of a number corresponding to the blank of the color table are uniformly distributed in a gradation range to be acquired and then registered into the color table in a case where the number of available colors of the color table is less than the number of graded colors to be originally acquired. The acquired graded colors which are most approximately equal to the graded colors to be originally used are allocated as the graded colors to be used for representation in a case where the number of graded colors registered in the color table is less than a required number of representation colors.

Therefore, graded colors can be acquired such that the distribution of the graded colors will become uniform irrespective of the number of graded colors to be acquired. Further, even if the number of acquirable graded colors is small, adequate gradation representation can be attained so that a new program can be started irrespective of the number of acquirable graded colors.

BRIEF DESCRIPTION OF THE DRAWINGS

Other objects and advantages of the invention will become apparent during the following description in conjunction with the accompanying drawings, in which.

DETAILED DESCRIPTION OF THE PREFERRED EMBODIMENTS

There will now be described embodiments of a graded color acquisition method and apparatus for image processing according to the present invention with reference to the accompanying drawings.

First Embodiment

Figure 5:
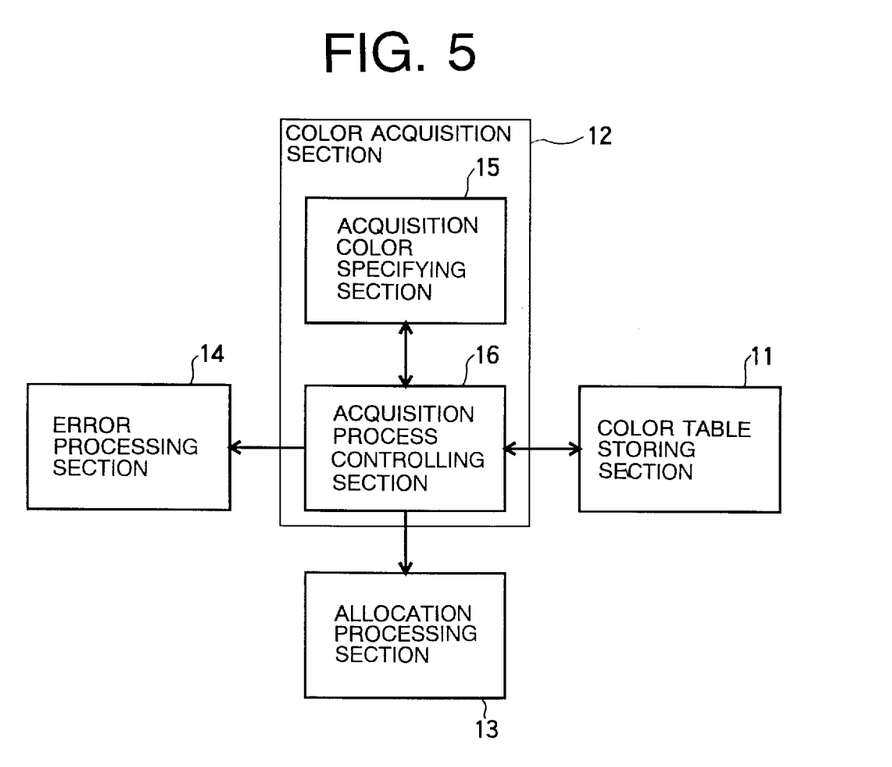
FIG. 5 is a block diagram showing construction of a principle graded color acquisition processing system according to a first embodiment of the present invention.

FIG. 5 illustrates the construction of a principle graded color acquisition system according to a first embodiment of the present invention.

The graded color acquisition system of FIG. 5 includes a color table storing section 11, color acquisition section 12, allocation processing section 13, and error processing section 14. The color table storing section 11 stores a color table of the system. The color acquiring section 12 has an acquisition color specifying section 15 and an acquisition process controlling section 16.

The acquisition process controlling section 16 effects the process of detecting a blank in the color table of the color table storing section 11. The acquisition process controlling section 16 also acquires graded colors of a number corresponding to the blank of the color table according to the specification of the acquisition color specifying section 15 and registers the acquired graded colors into the color table.

The acquisition color specifying section 15 specifies graded colors to be acquired as they are in a case where the number of available colors of the color table is equal to or larger than the number of graded colors to be originally acquired. In a case where the number of available colors of the color table is less than the number of graded colors to be originally acquired, the acquisition color specifying section 15 also specifies graded colors of a number corresponding to the blank of the color table such that they will be uniformly distributed in a gradation range to be acquired.

Allocation processing section 13 allocates acquired graded colors which are most approximately equal to the original graded colors which were to be used as the graded colors to be used for representation in a case where the number of graded colors registered in the color table is less than a required number of representation colors.

Error processing section 14 effects the process of displaying an error and inhibiting the starting of a program when the result of the color acquisition process does not satisfy the condition for correctly operating the image process program. An example of the process effected by error processing section 14 is when the number of graded colors acquired in the acquisition process controlling section 16 of the color acquisition section 12 is not sufficiently large.

The operation of the graded color acquisition system with the above construction is explained below. First, the acquisition process controlling section 16 of the color acquisition section 12 detects a blank in the color table of the system stored in the color table storing section 11.

In a case where the number of available colors in the color table detected by the acquisition process controlling section 16 is equal to or larger than the number of graded colors to be originally acquired, the acquisition color specifying section 15 specifies graded colors to be acquired as they are. In a case where the number of available colors in the color table is less than the number of graded colors to be originally acquired, the acquisition color specifying section 15 specifies graded colors of a number corresponding to the blank of the color table such that they will be uniformly distributed in an acquisition range to be acquired.

The acquisition process controlling section 16 effects the process of acquiring graded colors specified by the acquisition color specifying section 15 and the process of registering the graded colors into the color table of the color table storing section 11.

The allocation processing section 13 allocates those of the acquired graded colors which are most approximately equal to the graded colors to be originally used as the graded colors used for representation. This happens in a case where the number of graded colors registered in the color table is less than a required number of representation colors. Thus, adequate graded color acquisition is effected according to the remaining capacity of the color table, and the image processing program is started.

The error processing section 14 displays an error and inhibits the starting of a program when the result of the color acquisition process does not satisfy the condition for correctly operating the image processing program. An example is when the number of graded colors acquired in the acquisition process controlling section 16 of the color acquisition section 12 is not sufficiently large.

In the graded color acquisition system, graded colors to be acquired are acquired as they are in a case where the number of available colors of the color table of the system is equal to or larger than the number of graded colors to be originally acquired. Graded colors of a number corresponding to the blank of the color table are acquired while being uniformly distributed in a gradation range and then registered into the color table in a case where the number of available colors of the color table is less than the number of graded colors to be originally acquired. Those of the acquired graded colors which are most approximately equal to the graded colors to be originally used are allocated as the graded colors to be used for representation in a case where the number of graded colors registered in the color table is less than a required number of representation colors.

Therefore, graded colors can be acquired with a uniform distribution of graded colors irrespective of the number of graded colors to be acquired. Even if the number of acquirable graded colors is small, adequate gradation representation can be attained so that a new program can be started irrespective of the number of acquirable graded colors.

Second Embodiment

Figure 6:
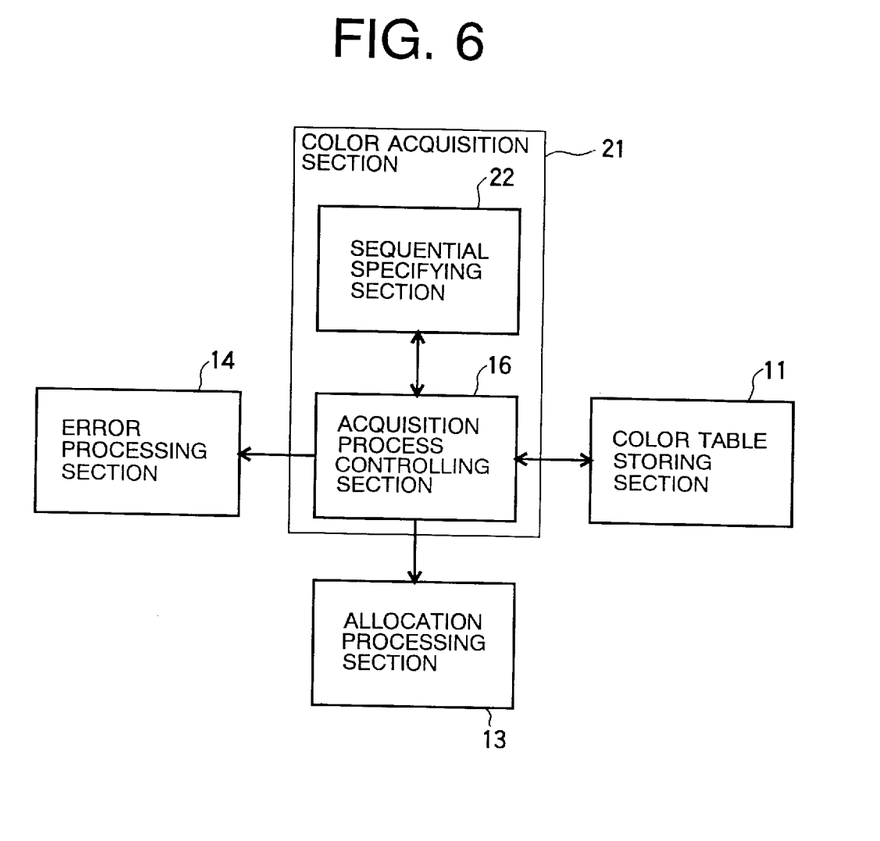
FIG. 6 is a block diagram showing construction of a graded color acquisition processing system according to a second embodiment of the present invention.

FIG. 6 shows the construction of a graded color acquisition system in an image processing according to a second embodiment of the present invention.

A system shown in FIG. 6 is a graded color acquisition system in which a portion corresponding to the color acquisition section 12 in the system of FIG. 5 has a more detailed construction. In the graded color acquisition system of FIG. 6, a color table storing section 11, allocation processing section 13, error processing section 14 and acquisition process controlling section 16 are basically the same as those of FIG. 5. In the graded color acquisition system of FIG. 6, a color acquisition section 21 is constructed by use of a sequential specifying section 22 instead of the color acquisition specifying section 15 of FIG. 5.

The sequential specifying section 22 sequentially specifies acquisition colors in the following order. That is, it first specifies graded colors at both ends of a required gradation range, then specifies a graded color at substantially a central portion of the un-acquired region. After this, sequential specifying section 22 sequentially specifies a graded color at substantially the central portion of the un-acquired region in the order of the acquisition color interval beginning with the largest graded color number. At this time, since the gradient in the central portion of the gradation range is important for specifying the graded color in many cases, it is preferable to preferentially deal with the gradation of a portion near the center of the required gradation range.

For example, the sequential specifying section 22 sets the acquisition order of graded colors to an order of color number 1, color number 9, color number 5, color number 3, color number 7, color number 4, color number 6, color number 2, and color number 8 in a case where the graded colors of color numbers 1 to 9 represent gradually changing gradation. If the graded colors are acquired in the above order, the gradation representation can be attained at substantially equal intervals by allocating colors close to the required graded colors as approximate colors by the allocation processing section 13, even if all of the color numbers cannot be acquired.

Figure 7:
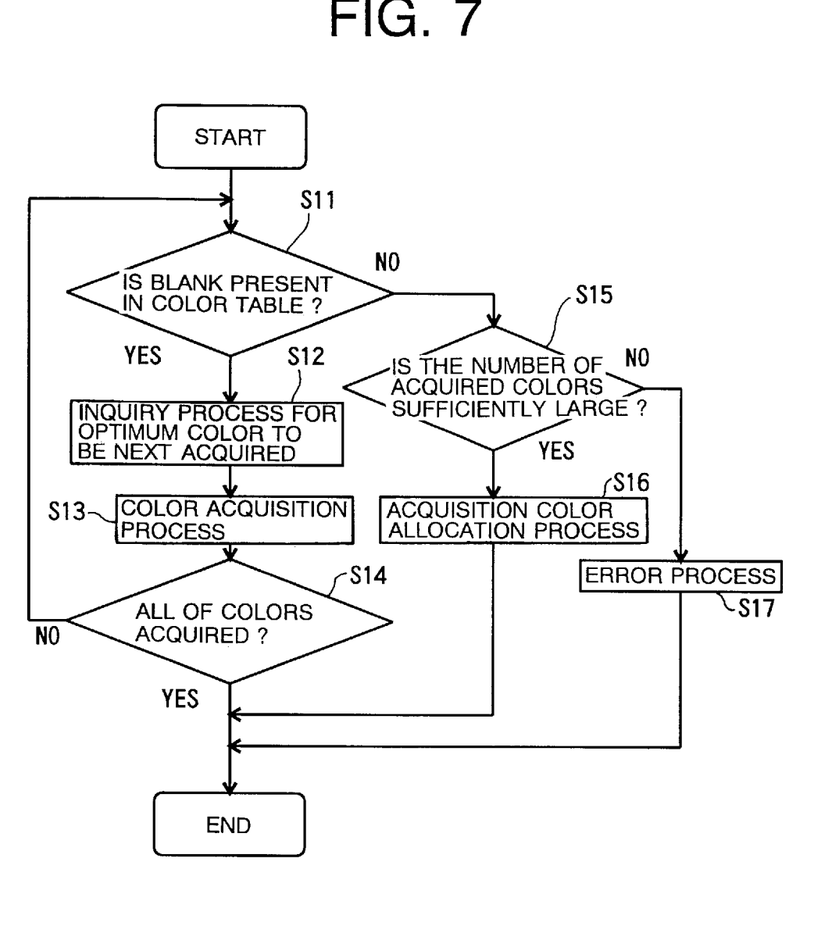
FIG. 7 is a flowchart illustrating the processing operation of the graded color acquisition processing system shown in FIG. 6.

Next, the graded color acquisition process in the graded color acquisition system of FIG. 6 is explained with reference to the flowchart of FIG. 7.

When the graded color acquisition process is started, whether a blank is present in the color table of the system stored in the color table storing section 11 is determined by the acquisition process controlling section 16 of the color acquisition section 21 (step S11). If the blank is present in the color table, the acquisition process controlling section 16 inquires about an optimum acquisition color to be next acquired (step S12) and sequentially effects the graded color acquisition process by sequential specifying section 22 (step S13). Each time color acquisition is executed, whether or not all of the colors are acquired is determined in the acquisition process controlling section 16 (step S14). Then, if all colors are not acquired, the process returns to the step S11.

Thus, if a blank is present in the color table, color acquisition is executed until it is determined in the step S14 that acquisition of all required colors is completed.

Further, in the course of the above process, if it is determined in the step S11 that no blank is present in the color table, whether the number of acquired colors at this time has reached a preset number of acquisition colors (previously set as a number of acquisition processes which is sufficient to effect required gradation representation) is determined by the acquisition process controlling section 16 (step S15). If it is determined in step S15 that the number of acquired colors has reached a preset number of acquisition processes, allocation of the acquisition colors is executed by the allocation processing section 13 (step S16) and then the process is ended. In the step S16, the acquired graded colors which are most approximately equal to the required graded colors are allocated as approximate colors of the required graded colors. If it is determined in the step S15 that the number of acquired colors does not reach the preset number of acquisition processes, it becomes impossible to ensure that colors for attaining the adequate distribution of colors used by the program can be acquired. Therefore, an error process is executed, starting of the program is interrupted (step S17), and the process is ended.

Also, if it is determined in the step S14 that acquisition of all of the colors is completed, the process is ended.

Further, for the inquiry process in the step S12, the sequentially specifying section 22 sets the acquisition order of graded colors to an order of color number 1, color number 9, color number 5, color number 3, color number 7, color number 4, color number 6, color number 2, and color number 8 and specifies the numbers of colors to be acquired in a case where the graded colors of color numbers 1 to 9 represent gradually changing gradation, for example.

Figure 8:
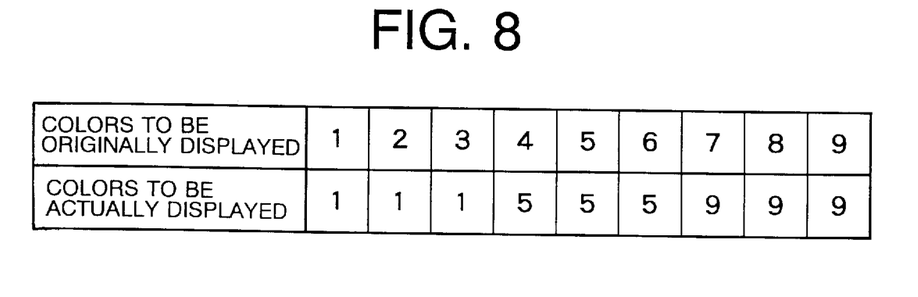
FIG. 8 is a schematic diagram illustrating the process of an allocation processing section in the operation of the graded color acquisition processing system shown in FIG. 6.

If the graded colors are acquired in the above order, the gradation representation can be attained with substantially uniform distribution by allocating colors close to the required graded colors as approximate colors, as shown in FIG. 8 in step S16, by the allocation processing section 13. The allocated colors are then used for representation, such as in a display, even if only graded colors up to the third graded color (color number 5) can be acquired. Actually, the possibility that only nine gradation levels are provided is less. In a case where only graded colors of three gradation levels can be acquired, it is determined in the step S15 that the number of acquired colors is insufficient, an error process is executed, and as a result, the allocation process is executed in a condition that only 100 colors among 256 colors can be acquired. Even in such a case, the image quality is somewhat lowered, but an image which can be visibly recognized can be obtained.

Third Embodiment

Figure 9:
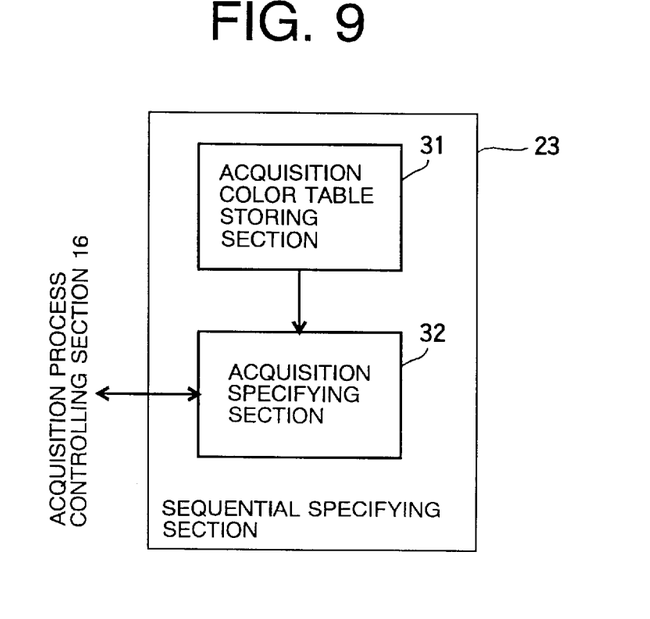
FIG. 9 is a block diagram showing the construction of an acquisition color specifying section which is a main portion of a graded color acquisition processing system according to a third embodiment of the present invention.

FIG. 9 shows a detailed construction of the sequentially specifying section of the graded color acquisition system in the image processing according to a third embodiment of the present invention.

The graded color acquisition system of FIG. 9 is an embodiment in which a portion corresponding to the sequential specifying section 22 of the system of FIG. 6 is constructed with greater detail. That is, in the graded color acquisition system of FIG. 9, a sequential specifying section 23 includes an acquisition color table storing section 31 and an acquisition specifying section 32.

The acquisition color table storing section 31 stores an acquisition color table indicating the order in which graded colors to be acquired are specified. In this case, the acquisition color table determines the specified order for every preset number of graded colors to be acquired.

As described above, when graded colors to be acquired are specified, graded colors at both ends of a required gradation range are first specified. Then, a graded color lying at substantially a central portion of the un-acquired region is specified. After this, a graded color lying at substantially a central portion of the un-acquired region is sequentially specified in the order of the acquisition color interval, from the largest one, to make it possible to attain representation with adequate gradation even if all of the graded colors cannot be acquired. At this time, since the gradient in the central portion of the gradation range is important for specifying the intermediate graded color among the acquisition colors in many cases, the gradation of a portion near the center of the required gradation range is preferentially dealt with. The number of graded colors to be actually acquired may be set to a limited number such as 256K, 32K or 64K, for example, in many cases. Therefore, the specifying order of graded colors to be acquired is practically sufficient only if the specifying order is unconditionally determined for every preset number of graded colors to be acquired. In this embodiment, the specifying order is fixedly held in the acquisition color table storing section 31 by use of the acquisition color table.

The acquisition specifying section 32 sequentially instructs acquisition of graded colors to the acquisition process controlling section 16 (according to the order of the acquisition color table storing section 31) by referring to the acquisition color table storing section 31.

In this case, since a calculation process of specifying the graded color to be acquired is not necessary, a simple and high-speed process can be attained. When all of the graded colors to be acquired cannot be acquired, the distribution of colors to be acquired becomes logically non-uniform. However in practice, the number of colors necessary for an actual program is gene rally set to several tens to several hundreds or more. If a preset number of colors (for example several tens of colors) can be acquired, no special problem occurs.

Fourth Embodiment

Figure 10:
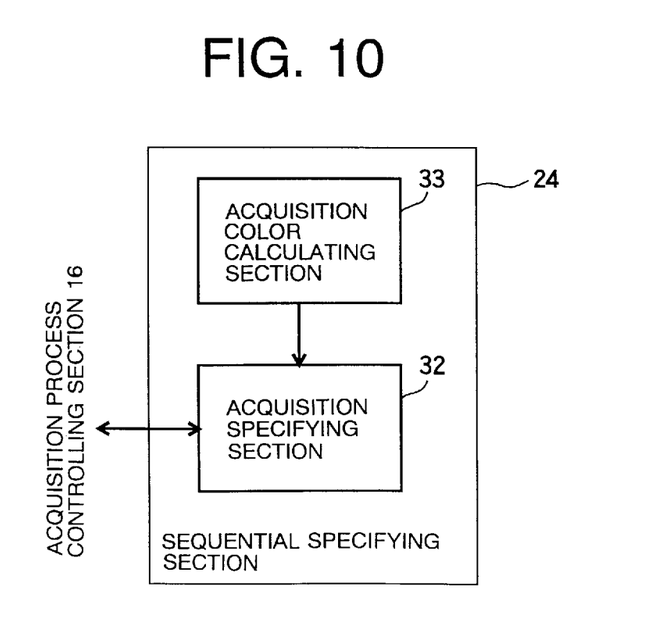
FIG. 10 is a block diagram showing the construction of an acquisition color specifying section which is a main portion of a graded color acquisition processing system according to a fourth embodiment of the present invention.

FIG. 10 shows a detailed construction of a sequentially specifying section of a graded color acquisition system in the image processing according to a fourth embodiment of the present invention.

Like the case of FIG. 9, the graded color acquisition system of FIG. 10 is another embodiment in which a portion corresponding to the sequential specifying section 22 in the system of FIG. 6 is constructed in greater detail. That is, in the graded color acquisition system of FIG. 10, a sequential specifying section 24 has an acquisition color calculating section 33 instead of the acquisition color table storing section 31 of FIG. 9.

The acquisition color calculating section 33 stores an acquisition color table indicating the order of specifying graded colors to be acquired.

As described above, when graded colors to be acquired are specified, graded colors at both ends of a required gradation range are first specified. Then, a graded color at substantially the central portion of the un-acquired region is specified. After this, a graded color at substantially the central portion of the un-acquired region is sequentially specified in the order of the acquisition color interval from the largest one so as to attain representation with adequate gradation even if all of the graded colors cannot be acquired. At this time, since the gradient in the central portion of the gradation range is important for specifying the intermediate graded colors among the acquisition colors, in many cases, the gradation of a portion near the center of the required gradation range is preferentially used.

That is, the acquisition color calculating section 33 effects the calculation for sequentially deriving the above graded colors. In this calculation, the operation of deriving distances between the acquired graded colors and inserting a next graded color at the center between the acquired graded colors having the longest distance is repeatedly executed. Then, as described above, since the gradient in the central portion of the gradation range is important in many cases, the gradation of a portion near the center of the required gradation range is preferentially used at the time of specifying the graded color in the above case.

Then, the acquisition specifying, section 32 sequentially instructs acquisition of graded colors to the acquisition process controlling section 16 according to the order of acquisition colors given from the acquisition calculating section 33.

In this case, since specification of graded colors to be acquired is determined by a calculation process, the calculation becomes slightly complicated and it takes a longer time for the process. However, graded colors can be specified in an adequate order irrespective of the number of graded colors to be acquired. Also, in this case, if all of the graded colors to be acquired cannot be acquired, the distribution of colors to be acquired becomes logically non-uniform, but the number of colors necessary for operation of the actual program is generally set to several tens to several hundreds or more. Furthermore, if a preset number of colors, for example several tens of colors among them can be acquired, no special problem occurs.

Fifth Embodiment

Figure 11:
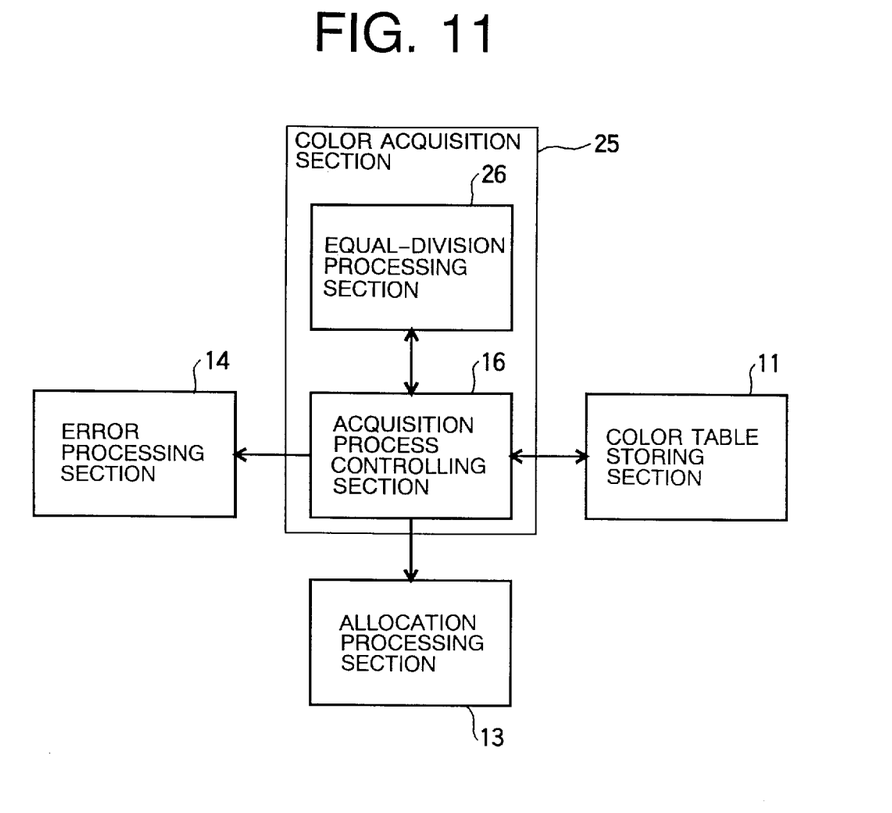
FIG. 11 is a block diagram showing the construction of a graded color acquisition processing system according to a fifth embodiment of the present invention.

FIG. 11 shows the construction of a graded color acquisition system in the image processing according to a fifth embodiment of the present invention.

The graded color acquisition system of FIG. 11 is an embodiment in which a portion corresponding to the color acquisition section 12 in the system of FIG. 5 is more concretely constructed. In the graded color acquisition system of FIG. 11, a color table storing section 11, allocation processing section 13, error processing section 14 and acquisition process controlling section 16 are substantially the same as corresponding portions of FIGS. 5 and 6. In the graded color acquisition system of FIG. 11, a color acquisition section 25 has an equal-division processing section 26 instead of the sequential specifying section 22 of FIG. 6.

Figure 12:
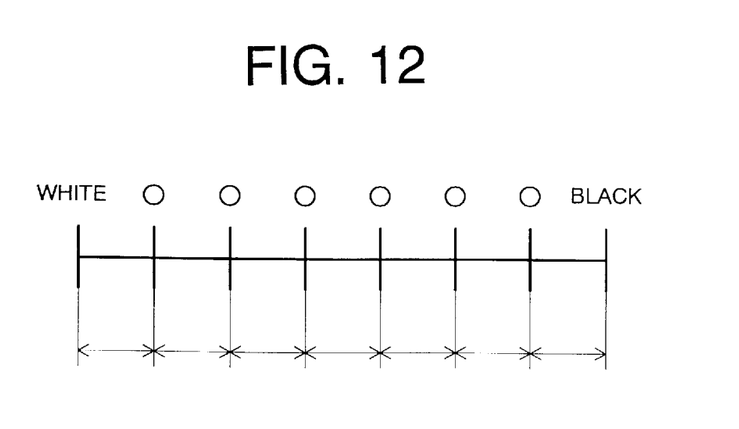
FIG. 12 is a schematic diagram illustrating the operation of the graded color acquisition processing system shown in FIG. 11.

The equal-division processing section 26 specifies graded colors as follows. First, graded colors to be acquired are derived by equally dividing the gradation range to be acquired into (available color number - 1) sections according to the number of available colors in the color table of the system stored in the color table storing section 11, which is detected by the acquisition process controlling section 16. For example, as shown in FIG. 12, if the number of available colors is 8, the required gradation range is equally divided into 7 sections and then graded colors to be acquired are derived.

The acquisition process controlling section 16 acquires graded colors thus derived by the equal-division processing section 26.

Also, in this case, the allocation processing section 13 allocates those of the acquired graded colors which are most approximately equal to the graded colors to be originally used as the graded colors used for representation in a case where the number of graded colors registered in the color table is less than a required number of representation colors.

The error processing section 14 effects the process of displaying an error and inhibiting the starting of a program when the result of the color acquisition process does not satisfy the condition for correctly operating the image processing program. For example, the process of displaying an error and inhibiting program starting is effected when the number of available colors in the color table of the system detected by the acquisition process controlling section 16 of the color acquisition section 12 is not sufficient large.

Thus, acquisition of graded colors is attained by equally dividing the gradation range according to the number of available colors and setting the distances of all of the available colors to the same value. Graded colors can be acquired more uniformly for a program using a less number of colors and a beautiful representation can be attained.

Sixth Embodiment

Figure 13:
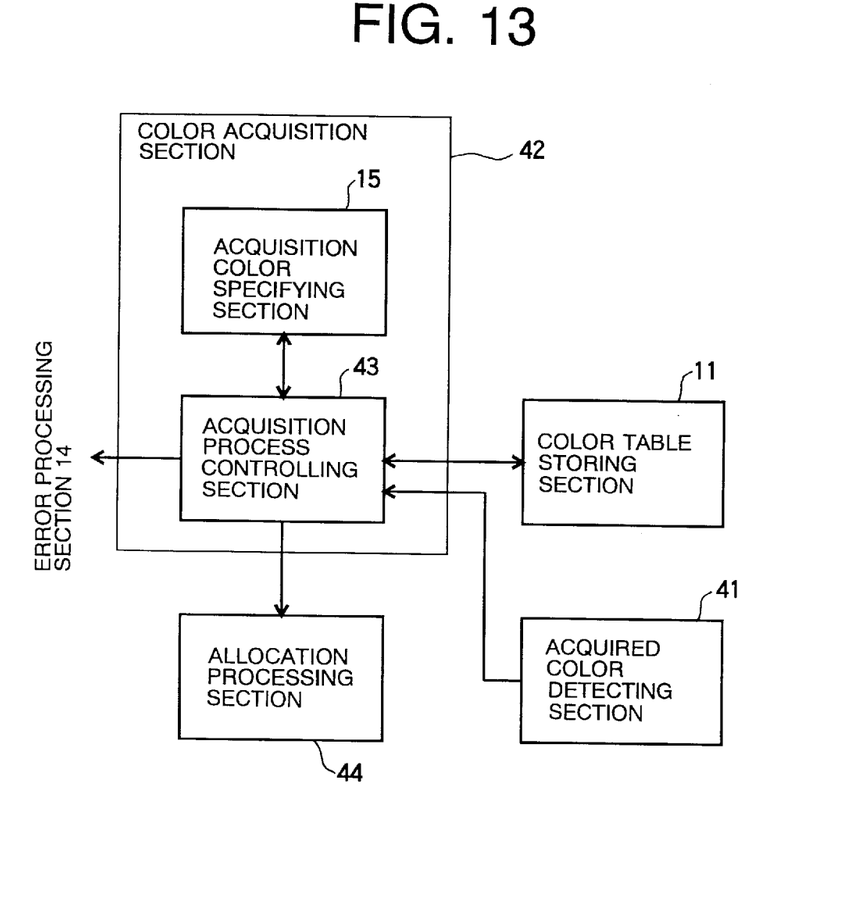
FIG. 13 is a block diagram showing the construction of a main portion of a graded color acquisition processing system according to a sixth embodiment of the present invention.

FIG. 13 shows the construction of a graded color acquisition processing system in the image processing according to a sixth embodiment of the present invention.

The graded color acquisition system of FIG. 13 is designed by taking graded colors acquired in another program which is being executed in the system of FIG. 5 into consideration. In the graded color acquisition system of FIG. 13, a color table storing section 11 and error processing section 14 may be basically the same as corresponding portions of FIG. 5. In FIG. 13, an acquired color detecting section 41 is provided, and the constructions of an acquisition process controlling section 43 and allocation processing section 44 of a color acquisition section 42 are made slightly different from those (i.e. the acquisition process controlling( section 16 and allocation processing section 13 of the color acquisition section 21) of FIG. 5, accordingly.

The acquired color detecting section 41 detects graded colors already acquired in the color table of the system by another program.

An acquisition process controlling section 43 of the color acquisition section 42 detects a blank in the color table of the color table storing section 11 and also detects already acquired graded colors to be detected by the acquired color detecting section 41. Acquired color detecting section 41 determines that the number of available colors of the color table is increased by a corresponding number and that the graded colors have been already acquired. Color detecting section 41 effects the process of acquiring graded colors of a number corresponding to the blank of the color table according to the specification of the acquisition color specifying section 15 and then registers them into the color table.

The acquisition color specifying section 15 specifies graded colors to be acquired as they are in a case where the number of available colors in the color table is equal to or larger than the number of graded colors to be originally acquired. Acquisition color specifying section 15 specifies graded colors of a number corresponding to the blank of the color table so as to be substantially uniformly distributed in a gradation range to be acquired in a case where the number of available colors in the color table is less than the number of graded colors to be originally acquired.

The allocation processing section 44 allocates graded colors containing graded colors already acquired by acquisition color specifying section 15 by another program and registered in the color table as graded colors to be used for representation.

Thus, even if the number of newly acquired graded colors is small, good gradation representation can be attained by permitting graded colors which are acquired by another program to be commonly used.

This invention is not limited to the above embodiments, and it is possible to dynamically manage acquisition colors by increasing the graded colors in a program now executed if the other program which is being simultaneously executed is terminated and a blank is provided in the color table, for example. In this case, it is possible to use a stack in the color table and manage the available stack by use of a stack pointer.

Figure 14:
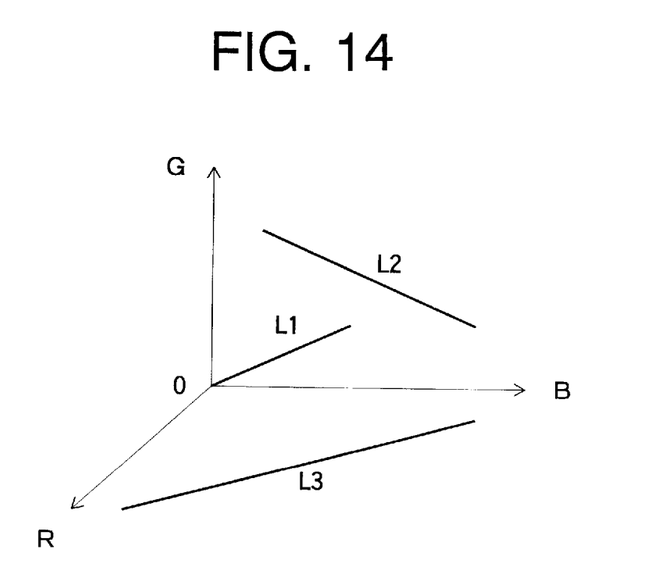
FIG. 14 is a schematic diagram for illustrating the other embodiments of the present invention.

Further, this invention can be attained in the same manner as described above for acquisition of graded colors for representation of gradation even if it is not the gray scale of density gradation from white to black along the line L1 on the color coordinate shown in FIG. 14. For example, acquisition of graded colors of gradation between a green series color and a blue series color along the line L2 of FIG. 14, gradation between red and blue along the line L3 and other color gradations or graded colors of various gradations such as density gradations of various colors may be attained.

It is apparent that, in this invention, a wide range of different working modes can be formed based on the invention without deviating from the spirit and scope of the invention.

What is claimed is:

1. A graded color acquisition method to acquire graded colors in a color table having a limited number of available colors, comprising:

a starting step of starting an image processing program which requires a number of graded colors from the color table;

a blank detection step of detecting a blank in the color table to determine a number of available colors in the color table;

a color acquisition step of acquiring graded colors corresponding to the blank in a case where the number of available colors in the color table is equal to or larger than the number of graded colors required by the image processing program, acquiring a number of graded colors corresponding to the blank and uniformly distributing the number of acquired graded colors across the blank in a case where the number of available colors in the color table is less than the number of graded colors required by the image processing program, and registering the acquired graded colors in the color table; and an allocation processing step of allocating graded colors from the color table which most approximately equal the graded colors required by the image processing program in a case where a number of graded colors registered in the color table is less than the number of graded colors required by the image processing program.

2. The method according to claim 1, further comprising:

an acquired color detection step of detecting a number of originally registered graded colors in the color table, and setting an available number of graded colors to be the number of originally detected registered graded colors less the number of detected graded colors registered in said color acquisition step.

3. The method according to claim 1, wherein said color acquisition step includes an acquisition color specifying step of first specifying graded colors at both ends of a gradation range to be originally acquired and then sequentially specifying a substantially central graded color between said specified colors; and an acquisition processing step of repeatedly effecting a process of sequentially acquiring graded colors specified in said acquisition color specifying step and registering the graded colors in the color table until one of an un-acquired graded color and the blank of the color table becomes unavailable.

4. The method according to claim 3, further comprising:

an acquired color detection step of detecting that graded colors to be originally used for representation are registered in the color table, and reducing an available number of graded colors by the number of detected graded colors registered in said color acquisition step.

5. The method according to claim 1, wherein said color acquisition step includes an equally dividing step of equally dividing the gradation range to be acquired based on the number of available colors to determine a number of graded colors to be acquired in a case where the number of available colors of the color table is less than the number of graded colors required by the image processing program, and an acquisition processing step of acquiring graded colors obtained in said equally dividing step and registering the graded colors in the color table.

6. The method according to claim 5, further comprising:

an acquired color detection step of detecting that graded colors to be originally used for representation are registered in the color table, and subtracting the number of detected graded colors for use in said color acquisition step from the number of available graded colors when the graded colors to be originally used for representation are detected in the color table.

7. A graded color acquisition apparatus which acquires graded colors in a color table having a limited number of available colors, comprising:

an image processing program which requires a number of graded colors from the color table;

color table storing means for storing the color table, wherein the color table has a blank which determines an available number of colors in the color table;

color acquisition means for detecting the blank in the color table, acquiring graded colors corresponding to the blank in a case where the number of available colors in the color table is equal to or larger than the number of graded colors required by the image processing program, acquiring a number of graded colors corresponding to the blank and uniformly distributing the number of acquired graded colors across the blank in a case where the number of available colors in the color table is less than the number of graded colors to be originally acquired, and registering the graded colors in the color table; and allocation processing means for allocating graded colors from the color table which most approximately equal the graded colors required by the image processing program in a case where a number of graded colors registered in the color table is less than the number of graded colors required by the image processing program.

8. The apparatus according to claim 7, further comprising:

acquired color detection means for detecting a number of originally registered graded colors in the color table, and setting an available number of graded colors to be the number of originally detected registered graded colors less the number of detected graded colors registered by said color acquisition means.

9. The apparatus according to claim 7, wherein said color acquisition means includes acquisition color specifying means for first specifying graded colors at both ends of a gradation range to be originally acquired and then sequentially specifying a substantially central graded color between said specified colors; and acquisition processing means for repeatedly effecting a process of sequentially acquiring graded colors specified by said acquisition color specifying means and registering the graded colors in the color table until one of an un-acquired graded color and the blank of the color table becomes unavailable.

10. The apparatus according to claim 9, further comprising:

acquired color detection means for detecting that graded colors to be originally used for representation are registered in the color table of the system, and reducing an available number of graded colors by the number of detected graded colors registered by said color acquisition means.

11. The apparatus according to claim 9, wherein said acquisition color specifying means includes order table storing means for previously storing a specifying order table indicating the acquisition order of graded colors; and acquisition instructing means for sequentially instructing acquisition colors to said acquisition processing means according to the specifying order table.

12. The apparatus according to claim 11, further comprising:

acquired color detection means for detecting that graded colors to be originally used for representation are registered in the color table, and giving the number of graded colors except the number of detected graded colors to said color acquisition means when the graded colors to be originally used for representation are detected in the color table.

13. The apparatus according to claim 9, wherein said acquisition color specifying means includes acquisition color calculating means for first giving graded colors at both ends of a gradation range to be originally acquired and then sequentially calculating and giving a substantially central graded color between said specified colors; and acquisition instructing means for sequentially instructing acquisition colors to said acquisition processing means according to graded colors given from said acquisition color calculating means.

14. The apparatus according to claim 13, further comprising:

acquired color detection means for detecting that graded colors to be originally used for representation are registered in the color table, and reducing an available number of graded colors by the number of detected graded colors registered by said color acquisition means when the graded colors to be originally used for representation are detected in the color table.

15. The apparatus according to claim 7, wherein said color acquisition means includes equal-division processing means for equally dividing the gradation range to be acquired based on the number of available colors to determine a number of graded colors to be acquired in a case where the number of available colors of the color table of the system is less than the number of graded colors to be originally acquired; and acquisition processing means for acquiring graded colors obtained in said equal-division processing means and registering the graded colors into the color table.

16. The apparatus according to claim 15, further comprising:

acquired color detection means for detecting that graded colors to be originally used for representation are registered in the color table, and subtracting the number of detected graded colors to said color acquisition means from the number of available graded colors when the graded colors to be originally used for representation are detected in the color table.

* * * * *